March 8, 1966     J. B. FEDER ETAL     3,239,552
PROCESS OF PREPARING BORATE ESTERS OF CYCLOALKANOLS
Filed July 6, 1962
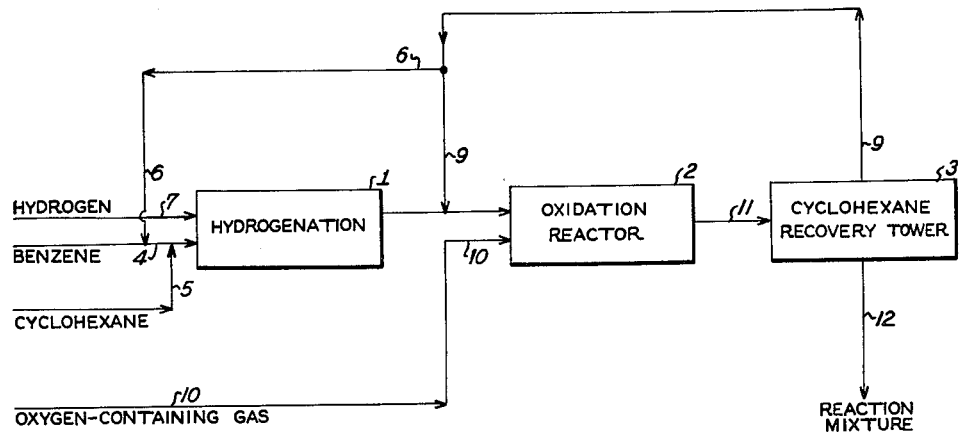
INVENTORS
JACK B. FEDER
JAMES H. CARROLL, JR.
BY *Bert J. Lewen*
ATTORNEY

United States Patent Office 3,239,552
Patented Mar. 8, 1966

3,239,552
PROCESS OF PREPARING BORATE ESTERS
OF CYCLOALKANOLS
Jack B. Feder, Dumont, and James H. Carroll, Verona,
N.J., assignors to Halcon International, Inc., a corporation of Delaware
Filed July 6, 1962, Ser. No. 208,133
4 Claims. (Cl. 260—462)

This invention relates to a new and improved process for the oxidation of hydrocarbons. More specifically, the instant invention relates to a process wherein cycloalkanes are oxidized by contact with a molecular oxygen containing gas. Still more specifically, this invention concerns the aforementioned oxidation when carried out in the presence of a boron compound. This application is a continuation-in-part of co-pending application, Ser. No. 154,802 filed November 24, 1961 and now abandoned.

Cycloalkane oxidation to cycloalkanol and cycloalkanone has been greatly improved by performing the oxidation in the presence of a boron compound, such as meta boric acid or boron oxide. This improved process is the subject matter of co-pending patent application, Ser. No. 85,987, and now abandoned filed January 31, 1961, wherein it is disclosed that the selectivity to cyclohexanol and cyclohexanone, in cyclohexane oxidation, is increased about 20% by the addition of boron compounds. While this improvement in selectivity is a noteworthy advance in the art, it is still desirable to effect further increases, since a more selective reaction results in the production of less waste reaction products. For example, where the oxidation reaction products are dehydrogenated to form phenol, in a plant producing 40 million pounds of phenol per year, a 2% increase in selectivity results in a saving of $50,000 in the cost of feed required.

The term "cycloalkane" used herein is intended to include both substituted and unsubstituted cyclic alkane compounds, such as, cyclohexane, methylcyclohexane, and dimethylcyclohexane.

As described in said application Serial Number 85,987, filed January 31, 1961, illustrative of the unsubstituted cycloalkanes are cyclopentane, cyclohexane, cycloheptane, cyclooctane and the like. The substituted cycloalkanes can be mono or poly-alkyl, aryl, alkaryl, or aralkyl substituted cycloalkanes such as methylcycloheptane, diethyl cyclooctane, and the like. Preferred boron compounds are boric acid, meta boric acid, tetra boric acid, boron oxide, or mixtures thereof.

In accordance with this invention, it has been found that further improvements in selectivity can be obtained by conducting the oxidation reaction in the presence of critical amounts of benzene-type compound.

"Benzene-type compound" as used herein, refers to benzene and alkyl-substituted benzene compounds. Preferably, these compounds, include materials boiling between 80° and 145° C., such as benzene, toluene and xylene. Benzene is the most desirable compound in the case of cyclohexane oxidation.

Amounts of benzene type compound less than the critical range result in lower selectivities, while greater amounts drastically inhibit the oxidation reaction.

The finding that the presence of controlled percentages of benzene type compounds facilitate oxidation selectivity is indeed surprising and unexpected. In the prior art, it is known that benzene generally tends to depress the quantity of free radicals present in a liquid system, thereby inhibiting oxidation reactions. For example, in the oxidation of paraffins, as taught by Lawrence et al., U.S. Patent No. 2,721,180, issued October 18, 1955, it is noted that it is desirable to substantially completely remove the aromatics. Even more relevant is U.S. Patent No. 2,931,834, which relates to cyclohexane oxidation. This patent states that aromatic concentration should not be greater than 0.2 wt. percent, and that even a higher purity is desired.

In a first embodiment in the instant invntion, it has been found that, in a batch process or in the start-up of a continuous process, the critical quantities of benzene-type compound range from about 0.01 to 0.8 wt. percent based on the cycloalkane, preferably 0.1 to 0.5%.

In another embodiment of the invention, it has been discovered that, in the batch process or start-up, benzene-typ ecompounds, up to 5 wt. percent can be present if initiators, as subsequently defined, are introduced into the reaction mass. These levels of benzene-type compounds not only improve selectivity, but also makes unnecessary the use of highly refined feed stocks.

Examples of these initiators include hydroperoxides, organic peroxides, ketones and aldehydes, such as di-t-butyl peroxide, methylethylketone peroxide, t-butyl hydroperoxide, acetaldehyde and cyclohexanone, and combinations thereof. The amount of initiator present is from 0.00001 to 0.01 part by weight based on weight of hydrocarbon feed is preferably 0.0001 to 0.001 weight percent. Other initiators may be employed. For example, certain compounds which will readily form peroxides when contacted with a molecular oxygen under reaction conditions.

In still a further embodiment of the instant invention, it has now been discovered, contrary to the teachings of the prior art, that a continuous process can be maintained, with high selectivities and conversions, with cycloalkane feeds having concentrations of benzene-type compounds of up to 5 wt. percent, at improved selectivities, without regard to the presence of an initiator.

Another embodiment of the instant invention contemplates a combination process wherein a benzene type compounds is hydrogenated under controlled conditions to form a cycloalkane. The cycloalkane is substantially oxidized in accordance with the instant invention. The hydrogenation process should be controlled so as to form a feed for the oxidation containing requisite amounts of the benzene type compounds. Alternately, the hydrogenation is carried out so as to convert substantially all of the benzene type compound to the cycloalkane. In this modification, the unreacted cycloalkane is recycled back to the oxidation reactor. Since the benzene type compound does not react during oxidation, its concentration continually increases in the cycloalkane recycle stream. By appropriately blending the recycle stream, which has a relatively high concentration of benzene, and the cyclohexane effluent from the hydrogenation zone, which has relatively low concentration of benzene, the feed to the oxidation reactor may be conveniently controlled so as to contain up to 4% benzene. After a certain point, it becomes necessary to purge a portion of the recycle stream to remove the built-up benzene type compound so as to maintain the desired benzene concentration. This purge stream may, after purification, be conveniently recycled to the hydrogenation step, wherein the cycloalkane acts as a diluent.

It will be noted that in accordance with the above ranges that a continuous process or a process utilizing an initiator during start-up can tolerate higher percentages of benzene that in the start-up of an uninitiated reaction. This is particularly important since once the reaction is underway, or, alternatively, when an initiator is used, the amount of benzene type compound in the feed is advantageously permitted to rise to higher concentrations. In addition to the important selectivity improvement obtained by such operation, this finding permits the use of cruder feed stocks, and requires less purge of the recycle stream. Since the purge is conventionally separated by distillation, and furthermore, since the distillation is a difficult one because of the similarity in boiling point between, say, cyclohexane and benzene, the distillation load on the process is significantly decreased.

To more fully describe the instant invention, attention is directed to the attached figure. This figure illustrates a flow sheet of a continuous process which is a preferred embodiment of the instant invention.

Benzene and cyclohexane are introduced into the hydrogenation zone 1 through lines 4 and 5, respectively. A purge stream containing primarily cyclohexane and 0.56% of benzene is recycled to the hydrogenation zone through line 6 and constitutes about 1% of the charge. Preferably, impurities are first removed from the purge stream. The weight ratio of cyclohexane to benzene entering the hydrogenation zone 1 is 80 to 20. The hydrogenation zone 1 is maintained at 135° C., 75 p.s.i.g. and contains a nickel on kieselguhr catalyst. The liquid hourly space velocity is 5 hrs.$^{-1}$ based on benzene. Hydrogen is introduced into the reactor through line 7. The effluent from the hydrogenation zone under these conditions consists substantially of cyclohexane and 0.05 wt. percent benzene. This effluent passes via line 8, combined with the cyclohexane recycle stream 9, and enters the oxidation reactor 2. The recycle stream 9 and the reactor effluent from line 8 are proportioned so as to result in a cyclohexane feed to the oxidation reactor containing 0.5% benzene. The oxidation is carried out in the presence of meta boric acid. A stream containing 8% oxygen and 92% nitrogen is introduced into the oxidation reactor via line 10. Other details of the oxidation reaction are shown in Example 3, infra. An effluent is withdrawn from the oxidation reactor 2 through line 11 and passed to a cyclohexane recovery tower 3. The unreacted cyclohexane, containing about 0.56% benzene, is removed overhead via line 9 and recycled as previously indicated. The reaction mixture consisting primarily of borate esters of cyclohexanol is removed via line 12. This mixture is hydrolyzed and cyclohexanol and cyclohexanone is recovered in accordance with the teaching of co-pending application U.S. Ser. No. 85,987. The cyclohexanol and cyclohexanone recovered is analyzed and found to contain 88.9% cyclohexanol and 5.7% cyclohexanone.

The following examples more specifically point out the advantages of the instant invention. Examples 1 to 5 relate to a batch process with no initiator present:

EXAMPLE 1

An autoclave is charged with 248 grams of meta boric acid and 3100 grams of cyclohexane containing about 0.001% of benzene. The charge is agitated, pressured to 125 p.s.i.g., and heated to 165°. The cyclohexane is oxidized by using gas containing 8% of molecular oxygen and 92% nitrogen. 65 standard liters of oxygen are reacted. The charge is cooled, drained from the reactor and after the hydrolysis procedure (described in U.S. copending patent application Ser. No. 85,987) 370 grams of oil are obtained. Analysis by gas chromatography indicates that the oil contains 84.6% cyclohexanol and 6.9% cyclohexanone for a total selectivity of 91.5% to the desired reaction products.

EXAMPLE 2

The procedure of Example 1 is repeated with the exception that 0.1% of benzene is present in the cyclohexane charge. During oxidation a total of 65 standard liters react. After treatment of the reaction mass as above, 370 grams of oil are obtained. Analysis by gas chromatography indicates 92.1% cyclohexanol and 2.7% cyclohexanone or a total selectivity of 94.8%.

EXAMPLE 3

Example 1 is repeated with the exception that 0.5% of benzene is present in the cyclohexane charge. During oxidation a total of 65 standard liters of oxygen react. The oil recovered is 370 grams and gas chromatographic analysis indicates 88.9% cyclohexanol and 5.7% cyclohexanone for a total selectivity to the desired reaction products of 94.6%.

EXAMPLE 4

The procedure of Example 1 is again replaced with the exception of 1% of benzene is present in the charge. The high oxygen concentration in the vent gas indicates the oxidation is inhibited drastically and substantially no reaction takes place.

EXAMPLE 5

The procedure of Example 1 is again repeated with the that 2% of benzene is present in the cyclohexane charge. As in Example 4, the high oxygen concentration in the vent gas indicates the oxidation is drastically inhibited and no reaction takes place.

It will be noted that Examples 2 and 3 are carried out in accordance with one embodiment of the instant invention. Example 1 shows the conventional oxidation wherein substantially no benzene is present. While the results of Example 1 show a selectivity of 91.5%, such selectivity is poorer than that obtained in Examples 2 and 3, namely, 94.8 and 94.6%. This increase of some 3% in the selectivity of the reaction is an unexpected and surprising result, since the material added, benzene, is conventionally regarded as an oxidation inhibitor and as detrimental to selectivity. Examples 4 and 5 clearly show that using greater amounts of benzene then that defined in the instant invention so severely curtails the cyclohexane oxidation as to render the process inoperative.

The above results are shown in tabular form in the table below:

Table

| Example No. | Wt. percent benzene in feed based on total feed | Total selectivity to cyclohexanone and cyclohexanol |
|---|---|---|
| 1 | 0.001 | 91.5 |
| 2 | 0.1 | 94.8 |
| 3 | 0.5 | 94.6 |
| 4 | 1.0 | (No reaction) |
| 5 | 2.0 | |

The following examples show the effect of initiators for permitting start-up with higher benzene concentrations:

EXAMPLE 6

To a batch type reactor 2520 parts of cyclohexane and 100 parts of meta boric acid are added. A stream containing 10% of oxygen is bubbled therethrough. Two runs are performed. In the first run 3% by weight of benzene is present and in the second 4 weight percent. The temperature is maintained at 165° C. and the pressure 175 p.s.i.g. In both cases, the oxygen in the effluent is substantially the same as that introduced. This indicates that no oxidation takes place.

EXAMPLE 7

Using the same cyclohexane and meta boric acid charge as in Example 6, the reactor is charged. Two wt. percent of benzene are present and .1 parts of di-t-butyl peroxide and 0.3 gram of cyclohexanone are added. The temperature is maintained at 165° C. and the pressure at 175 p.s.i.g. An oxygen containing gas is bubbled through the reaction mass and 65 liters absorbed. The reaction selectivity is 85.3% cyclohexanol and cyclohexanone at a conversion of 11.6%. The fact that this selectivity is lower than that in Examples 1–3 is due to higher water partial pressure leaving the reactor.

EXAMPLE 8

A reactor is charged with 2520 grams of cyclohexane and 84 grams of meta boric acid. The cyclohexane contains 3% by weight of benzene. 0.1 gram of di-t-butyl peroxide and .3 gram of cyclohexanone are added. At a temperature of 165° C. and a pressure of 175 p.s.i.g. 52 liters of oxygen are absorbed. The selectivity of cyclohexanone and cyclohexanol is 85.8% and a conversion of 8.9%.

EXAMPLE 9

Under the same conditions as Example 8, with the exception that the cyclohexane contains 6% by weight of benzene, oxygen is bubbled through the feed. Despite the presence of the initiator, the reaction does not initiate properly. This is evidenced by negligible oxygen absorption.

The above examples clearly show that high percentages of benzene, in the absence of an initiator, prevent the oxidation of the charge. However, as shown in Examples 7 and 8, the addition of an initiator permits the reaction to proceed in the presence of higher amounts of benzene, i.e., less than 6% as shown in Example 9, at high selectivities and conversions.

The following example shows the effect of benzene on the oxidation in the case of an initiated continuous process.

EXAMPLE 10

Cyclohexane and a slurry of meta boric acid in cyclohexane are fed continuously into the first stage of a three stage continuous reactor in series. A gas containing 8% oxygen is introduced into each stage. A temperature of 165° C., a total pressure of 125 p.s.i.g. The residence time is about one hour, divided equally among the stages. The reaction is carried out until 65 liters of oxygen are absorbed. The selectivity of the reaction, in relation to the benzene content in the cyclohexane feed, is shown in the following table:

Table

| Percent benzene: | Selectivity |
|---|---|
| 0 | 89.5 |
| 1 | 92.0 |
| 3 | 91.5 |
| 10 | 82.0 |

These data show that low concentrations of benzene improve selectivity, while greater amounts, i.e., 10% sharply lower the selectivity.

Appropriate reaction conditions which may be employed in the hydrogenation step of the instant invention are set forth in U.S. Patent No. 2,515,279.

It will be understood that modifications and variations may be effected without departing from the spirit of the invention.

We claim:
1. In a process for the preparation of borate esters of cycloalkanols by the oxidation of a cycloalkane selected from the group consisting of cyclohexane, methyl cyclohexane, dimethylcyclohexane, cyclopentane, cycloheptane and cyclooctane with a gas containing molecular oxygen in the presence of a boron compound selected from the group consisting of boric acid, meta boric acid, tetra boric acid, and boron oxide with removal of water formed during the oxidation, the improvement of initiating said oxidation in the presence of from about 0.01% to 0.8% of a benzene compound selected from the group consistnig of benzene, toluene, and xylene.

2. In a process for the preparation of borate esters of cycloalkanols by the oxidation of a cycloalkane selected from the group consisting of cyclohexane, methyl cyclohexane, dimethylcyclohexane, cyclopentane, cycloheptane and cyclooctane with a gas containing molecular oxygen in the presence of a boron compound selected from the group consisting of boric acid, meta boric acid, tetra boric acid, and boron oxide with removal of water formed during the oxidation, the improvement of initiating said oxidation in the presence of from about 0.01% to 5.0% of a benzene compound selected from the group consisting of benzene, toluene, and xylene and an initiator from the group consisting of di-t-butyl peroxide, methyl ethyl ketone peroxide, t-butyl hydroperoxide, acetaldehyde, and cyclohexanone.

3. In a continuous process for the preparation of borate esters of cycloalkanols by the oxidation of a cycloalkane selected from the group consisting of cyclohexane, methyl cyclohexane, dimethylcyclohexane, cyclopentane, cycloheptane and cyclooctane with a gas containing molecular oxygen in the presence of a boron compound selected from the group consisting of boric acid, meta boric acid, tetra boric acid, and boron oxide with removal of water formed during the oxidation, the improvement of conducting the initiated reaction in the presence of from about 0.01% to 5% of a benzene compound selected from benzene, toluene and xylene.

4. In a continuous process for the preparation of a borate ester of cyclohexanol wherein cyclohexane is oxidized with a gas containing molecular oxygen in the presence of meta boric acid with removal of water formed during the oxidation, the improvement of conducting the initiated reaction in the presence of from about 0.01% to 5% of benzene.

References Cited by the Examiner

UNITED STATES PATENTS

| 1,947,989 | 2/1934 | Hellthaler et al. | 260—462 |
| 3,042,722 | 7/1962 | Jason et al. | 260—586 |

CHARLES B. PARKER, *Primary Examiner.*